United States Patent
Dhandu et al.

(10) Patent No.: US 9,148,772 B2
(45) Date of Patent: Sep. 29, 2015

(54) VOLTE DEVICE PREFERENCE FOR E911

(71) Applicant: Cellco Partnership, Basking Ridge, NJ (US)

(72) Inventors: Siva Sandeep Dhandu, Princeton, NJ (US); Ephrem Chemaly, Jersey City, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 50 days.

(21) Appl. No.: 14/134,247

(22) Filed: Dec. 19, 2013

(65) Prior Publication Data

US 2015/0181401 A1 Jun. 25, 2015

(51) Int. Cl.
*H04M 11/04* (2006.01)
*H04W 4/22* (2009.01)
*H04W 64/00* (2009.01)

(52) U.S. Cl.
CPC ............... *H04W 4/22* (2013.01); *H04W 64/00* (2013.01)

(58) Field of Classification Search
CPC ....... H04W 4/22; H04W 76/007; H04W 4/02; H04W 48/18; H04W 64/00; H04W 80/00; H04W 88/06; H04M 2242/04; H04M 2242/30; H04M 3/5116
See application file for complete search history.

(56) References Cited

U.S. PATENT DOCUMENTS

| | | | |
|---|---|---|---|
| 2010/0003961 A1* | 1/2010 | Ray et al. | 455/404.2 |
| 2011/0076982 A1* | 3/2011 | Li et al. | 455/404.1 |
| 2012/0028661 A1* | 2/2012 | Fang et al. | 455/466 |
| 2012/0257550 A1* | 10/2012 | Chin et al. | 370/280 |
| 2013/0034052 A1* | 2/2013 | Saito | 370/328 |
| 2013/0231105 A1* | 9/2013 | Bai et al. | 455/426.1 |
| 2013/0301609 A1* | 11/2013 | Smith et al. | 370/331 |
| 2014/0120859 A1* | 5/2014 | Ekici et al. | 455/404.1 |
| 2015/0004927 A1* | 1/2015 | Mao et al. | 455/404.2 |
| 2015/0017923 A1* | 1/2015 | Mutya et al. | 455/67.11 |

* cited by examiner

*Primary Examiner* — Ajit Patel (57) ABSTRACT

A mobile device has several ways to determine position, some of which rely on interaction with the network. Once mobile device establishes a call, the call may remain on the network access technology and band over which the call was established, even if the call requires services not supported by the network access technology and/or band. So, when a call requires a position determination (e.g. emergency call), the mobile device selects a network access technology and band which will potentially improve the probability and accuracy of position determination, even if interaction with the network is not required because other position determination techniques (e.g. GPS) may be available.

20 Claims, 3 Drawing Sheets

VOLTE DEVICE PREFERENCE FOR E911

BACKGROUND

A determination of the location of a mobile device is required as part of the processing of an emergency call, such as a E911 call, from the mobile device. Location information (e.g. street address) is provided for the personnel at a public safety answering point (PSAP) that receives the call, to allow a call taker to dispatch assistance in response to the emergency. The location information is based on positional information (e.g. latitude and longitude) provided to the PSAP via a position determining element (PDE) which provides the positional information of the mobile device for updating an automatic location identification (ALI) database. The PDE may be network based, such as part of a mobile positioning center (MPC) within a mobile communication network serving the mobile device; or the PDE may be implemented at the mobile device, such as a global positioning system (GPS) chip in the mobile device. Whether in the network or the mobile device, the PDE determines the position of the mobile device based on information received from the mobile device and/or the mobile communication network serving the mobile device. The PDE provides the positional information to the MPC and the MPC updates a corresponding record in the ALI database. When the PSAP receives the E911 call, the PSAP queries the ALI database, receives the positional information from the ALI database, determines the location of the mobile device based on the positional information, and displays the positional information along with the location to the call taker.

The PDE receives information from the mobile device and/or the mobile communication network via various protocols. Most often, an individual PDE implements support for multiple protocols. A mobile device based PDE, for example, supports a protocol for receiving GPS information from a GPS receiver in the mobile device and a protocol for receiving timing information from the mobile communication network. The mobile device based PDE, however, may not support all of the various protocols for determining positional information of the mobile device. In addition, in some situations, the protocols supported by the mobile device based PDE may not successfully provide the necessary information for the mobile device based PDE to determine the position of the mobile device. In these situations, the MPC must rely on a network based PDE, which requires the mobile device to utilize a particular mobile network access technology.

Hence a need exists for a way to identify when a mobile device based PDE is unable to determine the mobile device position and ensure the mobile device is utilizing the mobile network access technology that will allow the MPC to provide positional information to the ALI database.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to a mobile device and operations thereof that require the mobile device position as part of an outbound call. The mobile device, for example, includes support for various position determination protocols. It is desirable to avoid situations in which the mobile device is unable to successfully complete any position determination protocol that allows the mobile device to determine the mobile device position. For example, if the mobile device is unable to determine position via GPS and does not support a necessary protocol to determine the position of the mobile device based on information provided by the network. The mobile device, therefore, selects a preferred network access technology that will allow, for example, a mobile communication network to determine the position of the mobile device.

Location services related to wireless E911 calls utilize a position determining element (PDE) to provide position information to a mobile positioning center (MPC) for updating an automatic location identifier (ALI) database with the position of the mobile device. In mobile communication networks operating in conformance with Long Term Evolution (LTE), the PDE is typically implemented in the mobile device. In mobile communication networks operating in conformance with code division multiple access (CDMA), the PDE is typically implemented in the mobile communication networks and/or as part of the MPC. Hence, a mobile device that supports both LTE and CDMA contains a PDE for use when operating on an LTE-based mobile communication network, but can rely on the mobile communication network when operating on a CDMA-based mobile communication network. Even with a network-based PDE, like in CDMA, the position protocol(s) typically require some operations of and communications with the mobile device.

The PDE in the mobile device prefers to receive positional information from a geographical positioning system (GPS) receiver in the mobile device. The GPS receiver, however, may not have sufficient visibility to receive a GPS signal from satellite(s) and provide positional information to the PDE.

The PDE in the mobile device also supports protocols for receiving timing information from multiple base stations within the mobile communication network, such as Observed Time Difference of Arrival (OTDOA), and calculating positional information based on the received timing information. OTDOA includes inter-frequency OTDOA and intra-frequency OTDOA. Intra-frequency OTDOA relies on timing information received from base stations transmitting in one particular band. Inter-frequency OTDOA uses timing information received from base stations transmitting in different bands. When the multiple base stations are all operating within the same frequency, the mobile device based PDE only needs to support intra-frequency OTDOA. When the multiple base stations, however, are operating on different frequencies, the mobile device based PDE needs to support intra-frequency OTDOA.

If the PDE in the mobile device does not support inter-frequency OTDOA, and the likelihood is high that the mobile device will need to detect multiple base stations operating on different frequencies, the MPC of the mobile communication network does not have a reliable fallback if GPS does not successfully provide positional information to the PDE in the mobile device. In this situation, if the device is operating on an LTE network overlaid on a legacy network which has been used for positioning (such as a CDMA network), and where the LTE network is not as mature as the legacy network, in one embodiment the mobile device prefers attempting the positioning on the legacy network because the probability of obtaining position location information on the legacy network is known and understood, as well as having a smaller statistical variance in position location accuracy.

When the mobile device operates on a network that supports multiple technologies (e.g., LTE and CDMA), voice calls may be routed over the legacy network (such as CDMA) or as Voice over LTE (VoLTE) calls over LTE. VoLTE delivers voice over an LTE network, for example, as packets of data. Thus, the mobile device can be referred to, in the examples, as a VoLTE device. In order to avoid position determination failure, as described at a high level above, the VoLTE device will prefer CDMA over LTE to complete a desired outbound call that requires location determination of the VoLTE device. Therefore, what is described in further details below is a VoLTE device preference for E911.

Reference now is made in detail to the examples illustrated in the accompanying drawings and discussed below. The position/location determination may apply in other non-emergency applications, such as general or commercial location based services. For discussion of examples, however, we will most often refer to applications of the technique to processing in relation to emergency calls from a mobile device 16. At least some of the following examples relate only to emergency calls from a mobile device 16.

Figure 1:
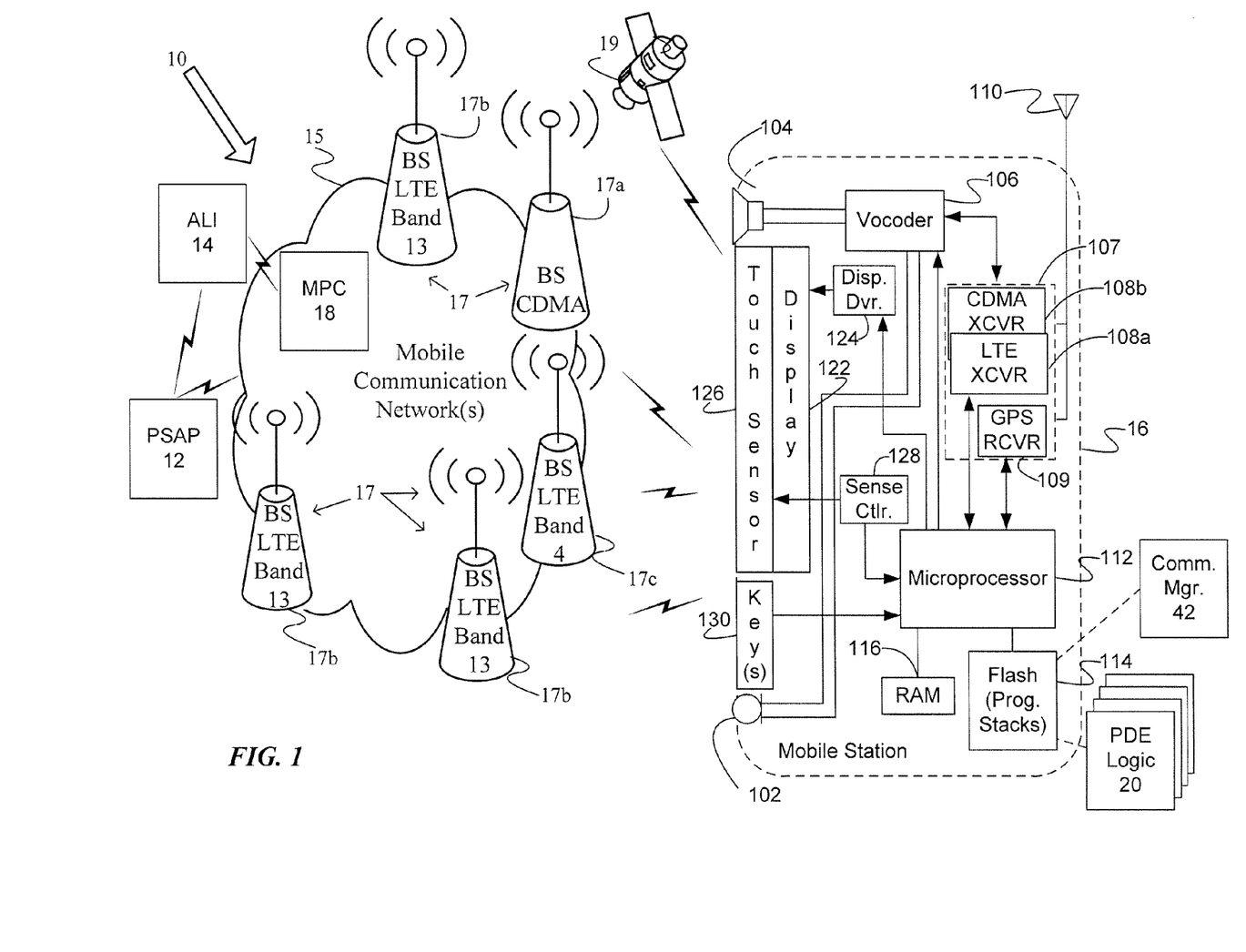
FIG. 1 is a high-level functional block diagram of an example of a system of networks/devices that provide various communications for a mobile device and support an example of Voice over Long Term Evolution (VoLTE) device preference for E911.

FIG. 1 illustrates a system 10 offering a variety of mobile communication services, including communications for establishing enhanced emergency (E911) calls by mobile device users. The example shows simply a mobile device 16 as well as a mobile communication network 15. The mobile device 16 is an example of a mobile device that may utilize the VoLTE device preference for position and/or location determination during an E911 call. However, the network will provide similar communications for many other similar users as well as for mobile devices/users that do not utilize the VoLTE device preference for E911. The network 15 provides mobile wireless communications services to the mobile device 16 as well as to other mobile devices (not shown), for example, via a number of base stations (BSs) 17. The present techniques may be implemented in any of a variety of available mobile networks 15 and/or on any type of mobile device compatible with such a network 15, and the drawing shows only a very simplified example of a few relevant elements of the network 15 for purposes of discussion here.

The mobile communication network 15 is implemented by a number of interconnected networks. Hence, the overall network 15 includes a number of radio access networks (RANs), as well as regional ground networks interconnecting a number of RANs and a wide area network (WAN) interconnecting the regional ground networks to core network elements. A regional portion of the network 15, such as that serving mobile device 16, can include one or more RANs and a regional circuit and/or packet switched network and associated signaling network facilities. Each RAN implements one or more network access technologies in conformance to a standard, such as code division multiple access (CDMA) and/or 4G long term evolution (LTE). Mobile communication network 15, for example, operates in conformance with both LTE and CDMA, as reflected in FIG. 1. Depending on the network configuration, each access technology may utilize one or more frequency bands.

Physical elements of a RAN operated by a mobile carrier include a number of base stations represented in the example by the base stations (BSs) 17. Although not separately shown, such a base station 17 can include a base transceiver system (BTS), which can communicate via an antennae system at the site of base station and over the airlink with one or more of the mobile devices 16, when the mobile devices are within range. Each base station can include a BTS coupled to several antennae mounted on a radio tower within a coverage area often referred to as a "cell." The BTS is the part of the radio network that sends and receives RF signals to/from the mobile devices 16 that are served by the base station 17. Although referred to here generically using the term base stations, these radio access points on the edge of the network may be referred to by other terms. In a 4G LTE network implementation, for example, the base stations are implemented by equipment identified as eNodeBs.

Base stations 17 operate in conformance with mobile wireless communications standards, as described above, to implement a mobile network access technology. In the example, base station 17a operates in conformance with CDMA while other base stations 17b, 17c operate in conformance with LTE. Furthermore, in a 4G LTE network implementation, each base station 17b, 17c operates within one of some number of assigned mobile network bands. For example, base station 17c operates within LTE band 4 while other base stations 17b operate within LTE band 13. Each mobile network band represents a RF signal or a range of RF signals that implement the airlink between the base station 17 and the mobile device 16. Within a cell, any one base station 17 or combination of base stations 17 implementing different mobile network access technologies and/or mobile network bands may operate. Within cell A, for example, base station 17a operates CDMA and base station 17b operates LTE band 13 while within cell B, for example, base station 17a operates CDMA and base station 17c operates LTE band 4. At the same time, within cell C, three base stations 17a, 17b, 17c may each operate CDMA, LTE band 13, and LTE band 4, respectively.

In mobile communication network 15, for example, base stations 17a operating CDMA are almost ubiquitous, while base stations 17b operating LTE band 13 are increasingly common but not yet as ubiquitous. In addition, base stations 17c operating LTE band 4 are, for example, continuing to be deployed in more areas of mobile communication network 15. At the same time, mobile devices 16 which support CDMA are common and mobile devices 16 which support LTE band 13 are not as common. Furthermore, mobile devices which support LTE band 4 are increasingly prevalent.

The radio access networks can also include a traffic network represented generally by the cloud at 15, which carries the user communications and data for the mobile devices 16 between the base stations 17 and other elements with or through which the mobile devices communicate. Specific elements of the network 15 for carrying the voice and data traffic and for controlling various aspects of the calls or sessions through the network 15 are omitted here for simplicity. It will be understood that the various network elements can communicate with each other and other aspects of the mobile communications network 15 and other networks (e.g., the public switched telephone network (PSTN) and the Internet) either directly or indirectly.

FIG. 1 further shows a public safety answering point (PSAP) 12 and an automatic location identifier (ALI) database 14. Mobile communication network 15 includes a mobile positioning center (MPC) 18 which provides positional information to the ALI database 14. As will be described in further detail below, a position determining element (PDE), located either in mobile device 16 or in mobile communication network 15 (e.g. as part of MPC 18), provides the positional information to the MPC 18 when an E911 call is placed. The E911 call is delivered to the PSAP 12 by mobile communication network 15, and the PSAP 12 queries the ALI database 14 to determine the location of the mobile device 16. The ALI database 14 returns the positional information provided by the PDE via MPC 18. The PSAP 12 then utilizes the positional information to determine the location of the mobile device 16 and displays both the positional information and the determined location of the mobile device 16 to a call taker.

Mobile device 16 can take the form of a portable handset, a smartphone or a personal digital assistant, although it may be implemented in other form factors. Program applications, including an application to assist in the VoLTE device preference for E911, can be configured to execute on many different types of mobile devices 16. For example, a mobile device application can be written to execute on a binary runtime environment for mobile (BREW-based) mobile device, a Windows Mobile based mobile device, Android, iOS for iPhone or iPad, Java Mobile, or RIM based mobile device such as a Blackberry or the like. Some of these types of devices can employ a multi-tasking operating system.

The application to assist in the VoLTE device preference for E911 under consideration here may run on touch screen type mobile devices as well as on non-touch type mobile devices. Our simple example, however, shows only the mobile device 16 as a touch screen type mobile device. Implementation of the VoLTE device preference for E911 will involve at least some execution of programming in the mobile devices, whereas E911 call processing and related position determination may involve implementation of user input/output functions and data communications through the network 15, from the mobile device 16.

It may be useful to consider the functional elements/aspects of an example of mobile device 16, at a high-level.

For purposes of such a discussion, FIG. 1 provides a block diagram illustration of an example of a touch screen type mobile device 16. Although the mobile device 16 may be a smartphone or may be incorporated into another device, such as a personal digital assistant (PDA) or the like, for discussion purposes, the illustration shows the mobile device 16 is in the form of a handset. The handset embodiment of the mobile device 16 functions as a normal digital wireless telephone station. For that function, the station 13 includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile device 16 includes a wireless communication system 107. Wireless communication system 107 includes at least one digital transceiver (XCVR) operating in accordance with a mobile network access technology. Wireless communication system 107, for example, includes a LTE XCVR 108a and a CDMA XCVR 108b. In addition, LTE XCVR 108a operates over one or more of a plurality of mobile network bands. LTE XCVR 108a, for example, operates over LTE band 13 and/or LTE band 4.

Each transceiver 108a or 108b provides two-way wireless communication of information, such as vocoded speech samples and/or digital information, in accordance with the technology of the network 15. The transceiver also sends and receives a variety of signaling messages in support of the various voice and data services provided via the mobile device 16 and the communication network. Each transceiver connects through RF send and receive amplifiers (not separately shown) to an antenna 110. One or more of the transceivers may also support various types of mobile messaging services, such as short message service (SMS), enhanced messaging service (EMS) and/or multimedia messaging service (MMS). Although the examples described below focus on an emergency voice call, this is for simplicity and the procedure(s) described also apply to an emergency call delivered via mobile messaging services.

Wireless communication system 107 also includes a geographical positioning system (GPS) receiver 109 for use in determining the position of the mobile device 16. As discussed more later, a determined position may be used by mobile device 16 and/or a network connected device to obtain location information, e.g. to lookup an applicable street address. GPS receiver 109 utilizes antenna 110 or another dedicated antenna (not shown) to communicate with a satellite 19 or collection of satellites 19 to receive information necessary to determine the position of mobile device 16. GPS receiver 109 delivers the received information to a microprocessor 112, described below. The microprocessor 112, as described below, includes necessary logic, such as logic to implement a position determining element (PDE) 20, to process the received information and determine the position of the mobile device 16.

The microprocessor 112 serves as a programmable controller for the mobile device 16, in that it controls all operations of the mobile device 16 in accord with programming that it executes, for all normal operations, and for operations involved in the VoLTE device preference for E911 under consideration here. In the example, the mobile device 16 includes flash type program memory 114, for storage of various "software" or "firmware" program routines and mobile configuration settings, such as mobile directory number (MDN) and/or mobile identification number (MIN), etc. The mobile device 16 may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, device PDE logic 20, a communication manager 42, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile device 16 includes a processor, and programming stored in the flash memory 114 configures the processor so that the mobile device is capable of performing various desired functions, including in this case the functions involved in the technique for VoLTE device preference for E911.

At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile device 16 includes a display 122, which the microprocessor 112 controls via a display driver 124, to present visible outputs to the device user. The mobile device 16 also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile device 16. The microphone 102 and speaker 104 may be used as additional user interface elements, for audio input and output, including with respect to related functions.

In an emergency, for example, a user dials 9-1-1 by selecting digits displayed on display 122. Touch sensor 126 and sense circuit 128 operating in conjunction provide necessary information to microprocessor 112 to identify each dialed digit. When the user initiates the call, by selecting send and/or otherwise indicating an intent to place the call, the microprocessor 112, executing communication manager 42, controls XCVR(s) 108*a* or 108*b* to place the call with mobile communication network 15 via base station 17. Mobile communication network 15 delivers the voice call to PSAP 12 and MPC 18 requests that mobile device 16 provides positional information. Microprocessor 112, via PDE logic 20, determines positional information related to mobile device 16 and provides, via XCVR(s) 108*a* or 108*b*, the positional information to MPC 18. MPC 18 delivers the positional information to ALI database 14 and PSAP 12 queries ALI database 14 for the positional information.

If, in this emergency example, the microprocessor 112, via PDE logic 20, fails to determine positional information, the ALI database 14 will be unable to return the positional information to PSAP 12. Thus, the VoLTE device preference for E911, as described below in relation to FIG. 2, is implemented, for example, to take advantage of the known positioning accuracy and probability for devices operating on the legacy network (such as CDMA).

The structure and operation of the mobile communication network 15 and mobile device 16, as outlined above, were described to by way of example, only.

Figure 2:
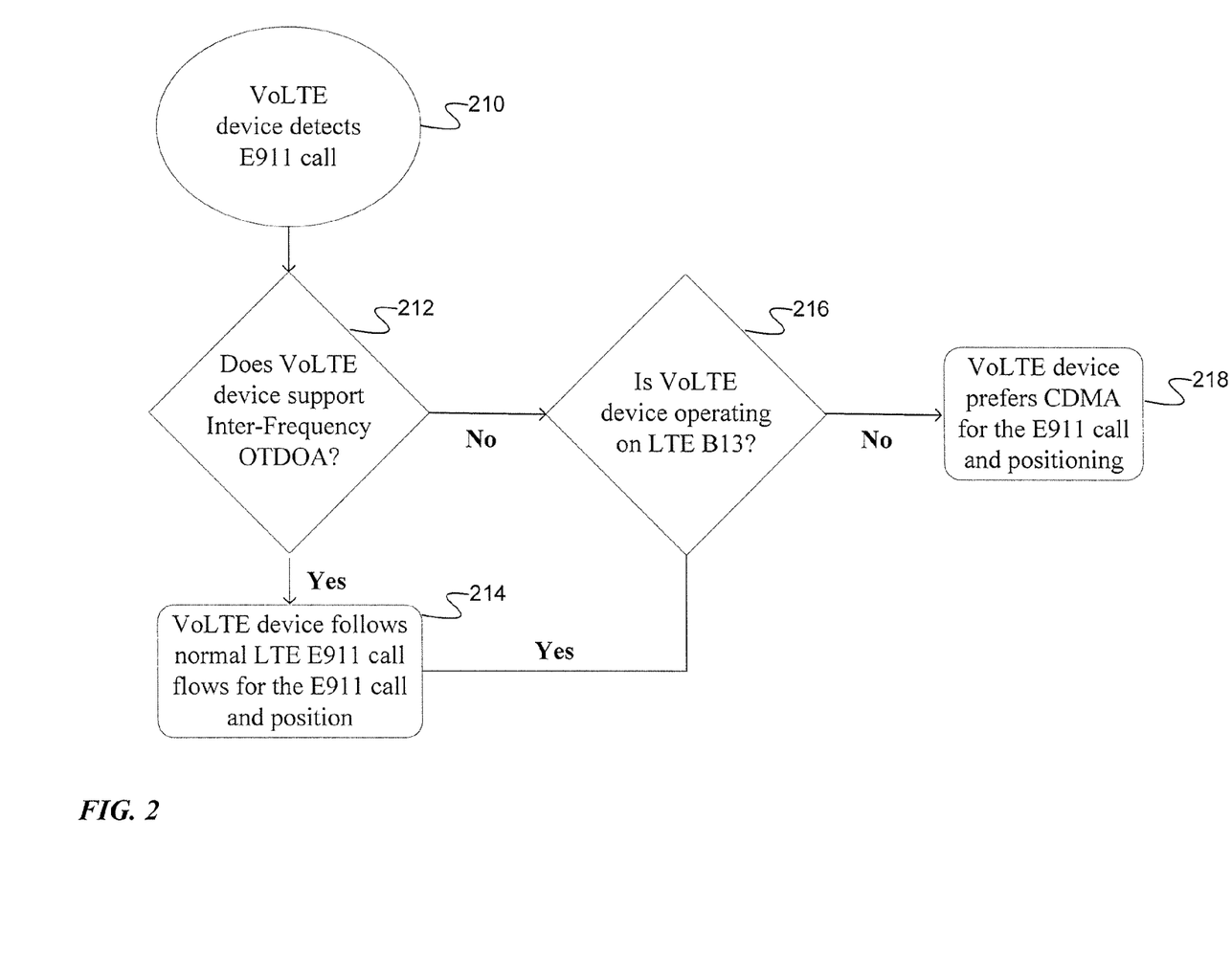
FIG. 2 is a high-level flow chart of an example of steps involved in VoLTE device preference for E911 utilized through a network/system like that shown in FIG. 1.

FIG. 2 illustrates an example of a flow chart depicting steps involved in VoLTE device preference for E911. In step 210, the mobile device 16 detects user initiation of an E911 call. Mobile device 16 supports, for example, VoLTE as well as voice call services over one or more alternative (e.g. legacy) wireless technologies, such as CDMA. Mobile device 16, for example, detects that the user has entered 9-1-1 and selected send, and/or otherwise indicated an intent to place an emergency call (e.g., using a voice activated command).

As part of any E911 call, the mobile device 16 and/or mobile communication network 15 must provide positional information of the mobile device 16 to the ALI database 14 for use by PSAP 12. As described above, the position determination may be performed by the PDE of mobile device 16 without assistance from mobile communication network 15, performed by the PDE of mobile device 16 based on information provided by mobile communication network 15, or performed by mobile communication network 15, such as by a network based PDE and/or MPC 18. In each approach, device position (e.g., latitude and longitude) is determined and provided to the ALI database 14; a call center such as a PSAP retrieves the device position from the ALI database 14 and translates the device position to useful location information (e.g., latitude and longitude are converted to a street address); and the call center makes the location information available to emergency assistance personnel at the call center.

GPS, for example, allows mobile device 16, utilizing GPS receiver 109, to directly perform position determination of mobile device 16 without assistance from mobile communication network 15. GPS, however, requires electromagnetic visibility between mobile device 16 and one or more satellites 19. In some situations, mobile device 16 has limited visibility of necessary satellites 19. In a heavily wooded area or within a building, for example, GPS receiver 109 of mobile device 16 may not have visibility of the necessary satellites 19. In these situations, mobile device 16 performs some or all of the position determination, for example, based on processing of signals provided by mobile communication network 15.

One example of position determination based on signals from the mobile communication network 15 is Observed Time Difference of Arrival (OTDOA). In a mobile communication network 15 that operates in conformance with LTE, for example, OTDOA facilitates position determination of mobile device 16 by providing beacon signals from multiple base stations 17. Each base station 17 has a known, fixed position. The mobile device 16 receives each beacon signal from each base station 17 and, based on an observation of the difference in arrival time for each beacon signal as well as the known, fixed position of each base station 17, calculates the position of the mobile device 16 utilizing multilateration. There are two forms of OTDOA: inter-frequency and intra-frequency. Intra-frequency OTDOA relies on timing information received from base stations transmitting in one particular band. Inter-frequency OTDOA uses timing information received from base stations transmitting in different bands.

In the LTE network example, neighboring base stations 17 providing beacon signals may operate on the same mobile network band, e.g. LTE band 4; or they may operate on different mobile network bands, e.g. LTE band 4 and LTE band 13. Intra-frequency OTDOA is sufficient when neighboring base stations 17 used in the position determination operate on the same mobile network band, e.g. LTE band 4 or LTE band 13. Inter-frequency OTDOA, however, is required when neighboring base stations 17 operate on different mobile network bands, e.g. LTE band 4 and LTE band 13. For example, if a mobile device 16 is operating via a base station 17*c* on LTE band 4, but some or all of the neighboring base stations 17 are operating on LTE band 13, the mobile device 16 will likely receive beacon signals from base stations 17*b* and 17*c* operating on different LTE bands. Therefore, in this example, mobile device 16 must support inter-frequency OTDOA or the positional determination based on OTDOA will fail.

Mobile communication network 15, as described above in relation to FIG. 1, includes, for example, various base stations 17. Mobile communication network 15 includes, for example, more base stations 17*b* operating on LTE band 13 than base stations 17*c* operating on LTE band 4. Mobile communication network 15 conducts calls, for example, only over one mobile network band, e.g. LTE band 4 or LTE band 13. For example, if mobile device 16 initiates an outbound call over base station 17*c* operating on LTE band 4, mobile communication network 15 will conduct the entire call over LTE band 4, unless signal conditions and/or quality on the selected mobile network band are sufficiently degraded or the mobile device 16 moves into a new cell without a base station 17*c* operating on LTE band 4. Mobile device 16 can perform intra-frequency OTDOA position determination if it can receive signals from enough LTE base stations on the band that the device 16 will use for the call.

In our mobile communication network 15 example, where base stations 17*b* operating on LTE band 13 are more prevalent than base stations 17*c* operating on LTE band 4, the mobile device 16 will likely be able to perform intra-frequency OTDOA on LTE band 13 but may not be able to perform intra-frequency OTDOA on LTE band 4. Hence, if the E911 call would be on LTE band 4, mobile device 16 must support inter-frequency OTDOA to perform position determination because mobile device 16 will not be able to receive and process beacon signals from base stations 17 operating on different mobile network bands (e.g. mobile device 16 operating on LTE band 4 cannot receive beacon signals from a neighboring base station operating on LTE band 13 without support for inter-frequency OTDOA). If mobile device 16 does not, for example, support inter-frequency OTDOA, mobile device 16 may be unable to perform position determination based on signals from the network if the mobile device 16 would otherwise establish the call on LTE band 4.

In the examples, if mobile device 16 is unable to perform position determination without assistance from the network 15 (e.g. because satellite signals are blocked at the time of the emergency call), and mobile device 16 does not support position determination based on signals from the network 15 (e.g. because the mobile device 16 does not support inter-frequency OTDOA, and is operating on an LTE band with limited neighboring base stations operating on the same band such that intra-frequency OTDOA using LTE is unable to be provided), then mobile device 16 in one embodiment prefers a legacy mobile network access technology that is known to reliably provide sufficient overall accuracy for determining position of the mobile device 16. Alternatively, if mobile device 16 supports position determination based on signals from the network 15 (e.g. because the mobile device 16 supports inter-frequency OTDOA or the mobile device is operating on an LTE band with a sufficient number of neighboring base stations operating on the same band to enable intra-frequency OTDOA), then mobile device 16 can, for example, prefer LTE on either band to establish the emergency call.

In a mobile communication network 15 that also operates in conformance with CDMA, multiple CDMA base stations 17*a* exchange information to determine the position of mobile device 16 and provide the position determination to MPC 18 (e.g. when GPS is not successful or is otherwise unavailable). CDMA is more ubiquitous, and as a result, it is more likely that the mobile device 16 will be within range of a sufficient number of CDMA base stations 17*a* to obtain a position fix. Therefore, when mobile device 16 does not support position determination based on signals from other technologies or bands of the network 15 that the device 16 might otherwise use to make the E911 call, CDMA is the preferred mobile network access technology.

Returning to the flow chart of FIG. 2, when mobile device 16 detects an E911 call in step 210, mobile device 16 determines whether mobile device 16 supports inter-frequency OTDOA in step 212. If mobile device 16 supports inter-frequency OTDOA in step 212, then mobile device 16 initiates the call normally in step 214 over whatever LTE band it is using. The mobile device 16 implements the normal flow/process for a VoLTE type E911 call.

If mobile device 16 does not support inter-frequency OTDOA in step 212, then mobile device 16 determines if the mobile device 16 is operating over LTE band 13, in step 216. In the examples of FIGS. 1 and 2, the mobile communication network 15 contains sufficient neighboring base stations operating over LTE band 13 that will provide beacon signals such that, even if mobile device 16 only supports intra-frequency OTDOA, mobile device 16 is likely to receive the necessary signals from the network 15 to determine the position of mobile device 16. It is determined, for example, if mobile device 16 is served by a base station 17 operating in LTE band 13. If mobile device 16 is operating over LTE band 13 in step 216, then mobile device 16 initiates the call normally in step 214 utilizing LTE band 13. The mobile device 16 implements the normal flow/process for a VoLTE type E911 call.

Returning to the decision in step 216, processing branches to step 218 if mobile device 16 determines that mobile device 16 does not support inter-frequency OTDOA and that mobile device 16 is not operating over LTE band 13. As such, mobile device 16 may, in some situations, be unable to perform position determination without assistance from mobile communications network 15, should GPS be unavailable. In addition, mobile device 16 does not support inter-frequency OTDOA in order to perform position determination based on signals from the mobile communications network 15. MPC 18, however, must still provide the positional information of mobile device 16 to the ALI database 14 as part of the E911 call. Therefore, mobile device 16 prefers CDMA, for example, to conduct the call in step 218. Hence, at 218, the mobile device 16 places the E911 call via CDMA base station 17*a*, and the mobile device 16 implements processing to establish a CDMA type E911 call and to perform associated device positioning. In this way, MPC 18 will be able to provide the positional information of mobile device 16 to the ALI database 14 as part of the E911 call.

In various examples described above, it is assumed that the mobile communication network 15 has fewer LTE band 4 base stations 17*c* than LTE band 13 base stations 17*b*. In such examples, the mobile device 16 prefers establishing the E911 call over CDMA rather than LTE band 4, in order to overcome lack of support for inter-frequency OTDOA when the mobile device 16 is likely to operate over LTE band 4.

In the examples, the preference is fixed and mobile device 16 will always prefer a legacy network access technology with known reliability and accuracy when mobile device 16 does not support inter-frequency OTDOA or is operating on a mobile network band that likely does not have sufficient neighboring nodes to support intra-frequency OTDOA. In some portions of mobile communication network 15, however, there are, for example, a sufficient number of neighboring LTE band 4 base stations 17*c* to support intra-frequency OTDOA without the mobile device 16 needing to support inter-frequency OTDOA. When mobile device 16 operates within these portions of mobile communication network 15, the VoLTE device preference for E911, for example, might be overridden so as to allow mobile device 16 to implement the normal flow/process for a VoLTE type E911 call over LTE band 4.

In one such alternative example, mobile device 16 may detect a sufficient number of neighboring LTE band 4 base stations 17c (e.g. 3 or more LTE band 4 base stations 17c) to successfully complete intra-frequency OTDOA. Such detection may be based on, for example, a reoccurring query sent from mobile device 16 to mobile communication network 15 during normal operation of mobile device 16 prior to an E911 call being placed or on mobile device 16 recording the number of neighboring base stations 17c currently reachable by mobile device 16. The query response, in one example, may contain a number of neighboring base stations 17c or an override indication.

Alternatively, mobile device 16 may be unable to perform such detection (e.g., most recent query fails, mobile device 16 is unable to send a query, or mobile device 16 is unable to record reachable neighboring base stations) but mobile device 16 may determine that the last known GPS position of mobile device 16, for example, places mobile device 16 within a portion of mobile communication network 15 with sufficient neighboring LTE band 4 base stations 17c. In these examples, mobile device 16 overrides VoLTE device preference for E911 and implements the normal flow/process for a VoLTE type E911 call over LTE band 4.

In the above description, VoLTE device preference for E911 has been described by way of example, only.

Figures 3, 4:
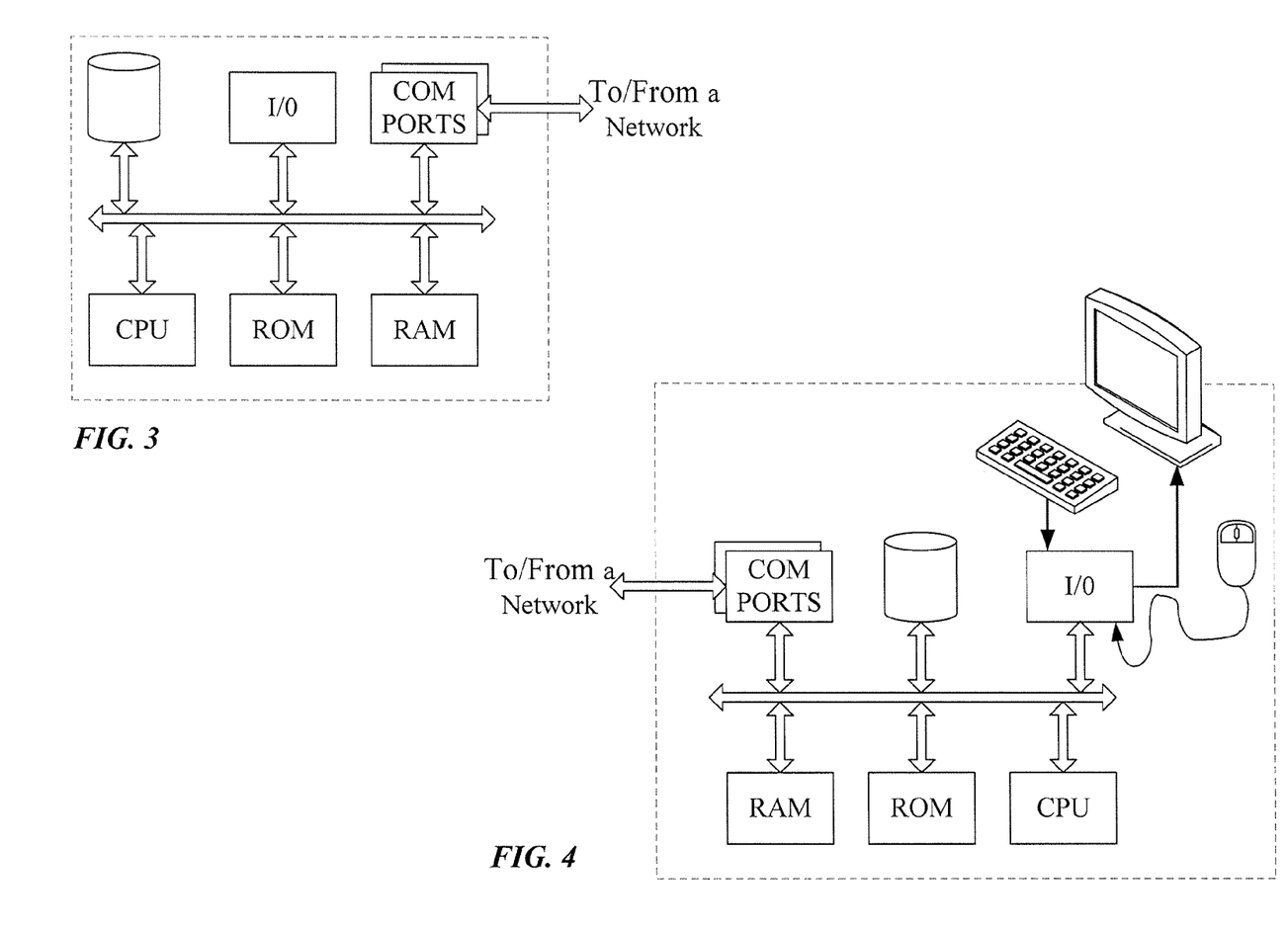
FIG. 3 is a simplified functional block diagram of a computer that may be configured as a host or server, for example, to function as the base station in the system of FIG. 1.
FIG. 4 is a simplified functional block diagram of a personal computer or other work station or terminal device.

FIGS. 3 and 4 provide functional block diagram illustrations of general purpose computer hardware platforms. FIG. 3 illustrates a network or host computer platform, as may typically be used to implement a server, such as MPC 18 and/or ALI database 14. FIG. 4 depicts a computer with user interface elements, as may be used to implement a personal computer or other type of work station or terminal device, although the computer of FIG. 4 may also act as a server if appropriately programmed. It is believed that the general structure and general operation of such equipment as shown in FIGS. 3 and 4 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 4). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of VoLTE device preference for E911 outlined above may be embodied in programming for a mobile device 16. Program aspects of the technology may be thought of as "products" or "articles of manufacture" typically in the form of executable code and/or associated data that is carried on or embodied in a type of machine readable medium, e.g. in the mobile device 16 or for use in some way to hold or carry programming to be loaded into a mobile device. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider or original equipment manufacturer for the mobile device 16 into the memory of mobile device 16. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the mobile device 16, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device, comprising:
a processor configured to control operations of the mobile device;
a wireless communication system comprising:
    at least one wireless transceiver configured to provide mobile communications through a network via wireless link over a plurality of mobile network bands utilizing a plurality of mobile network access technologies;
    a global positioning system (GPS) receiver configured to receive a signal from at least one satellite and transfer the signal to the processor; and
    a memory;
logic in the memory to support one of a plurality of protocols for communication with the network to determine position of the mobile device; and
a communication manager program in the memory, wherein execution of the communication manager program by the processor configures the mobile device to implement functions, including functions to:
    detect initiation of an outbound call, wherein:
        the outbound call requires a position determination of the mobile device to be performed; and
        the processor controls the at least one wireless transceiver to conduct the outbound call over only one mobile network band of the plurality of mobile network bands utilizing only one mobile network access technology of the plurality of mobile network access technologies;
    determine over which one mobile network band the processor intends to control the at least one wireless transceiver to conduct the outbound call;
    select a preferred mobile network access technology based on:
        the one protocol for communication with the network to determine the position of the mobile device supported by the logic in the memory; and
        the intended one mobile network band; and
    operate the at least one wireless transceiver to establish the outbound call over the selected preferred mobile network access technology.

2. The mobile device of claim 1, wherein the outbound call is an enhanced emergency (E911) call.

3. The mobile device of claim 2, wherein:
the preferred mobile network access technology consists of one of long term evolution (LTE) or a legacy network access technology; and
the mobile device does not comprise logic in the memory to support inter-frequency observed time difference of arrival (OTDOA) over LTE as one of the plurality of protocols for communication with the network to determine device location.

4. The mobile device of claim 3, wherein the preferred mobile network access technology is the legacy network access technology when the determined intended one mobile network band lacks a sufficient number of neighboring base stations operating on the determined intended one mobile network band to support intra-frequency OTDOA over LTE.

5. The mobile device of claim 4, wherein the preferred mobile network access technology is LTE when the determined intended one mobile network band has a sufficient number of neighboring base stations operating on the determined intended one mobile network band to support intra-frequency OTDOA over LTE.

6. The mobile device of claim 4, wherein:
the mobile device determines the number of current neighboring base stations operating on the determined intended one mobile network band reachable by the mobile device; and
when the determined number of currently reachable neighboring base stations meets or exceeds a threshold sufficient to support intra-frequency OTDOA over LTE, the preferred mobile network access technology is LTE.

7. The mobile device of claim 2, wherein:
the preferred mobile network access technology includes one of long term evolution (LTE) or a legacy network access technology;
the mobile device comprises logic in the memory to support inter-frequency observed time difference of arrival (OTDOA) over LTE as one of the plurality of protocols for communication with the network to determine device location; and
the preferred mobile network access technology is LTE.

8. An article of manufacture, comprising:
a non-transitory computer readable medium;
logic in the non-transitory computer readable medium to support one of a plurality of mobile device protocols for communication with a network to determine device position; and
programming embedded in the non-transitory computer readable medium, wherein execution of the programming configures a processor of a mobile device to cause the mobile device to implement functions, including functions to:
detect initiation of an outbound call of the mobile device, wherein:
the outbound call requires a position determination of the mobile device to be performed; and
the mobile device conducts the outbound call over only one mobile network band of a plurality of mobile network bands utilizing only one mobile network access technology of a plurality of mobile network access technologies;
determine over which one mobile network band the mobile device intends to conduct the outbound call;
select a preferred mobile network access technology based on:
the one protocol for communication with the network to determine device position supported by the logic; and
the intended one mobile network band; and
establish the outbound call over the selected preferred mobile network access technology.

9. The article of manufacture of claim 8, wherein the outbound call is an enhanced emergency (E911) call.

10. The article of manufacture of claim 9, wherein:
the preferred mobile network access technology includes one of long term evolution (LTE) or a legacy network access technology; and
the article of manufacture does not comprise logic in the non-transitory computer readable medium to support inter-frequency observed time difference of arrival (OTDOA) over LTE as one of the plurality of protocols for communication with the network to determine device position.

11. The article of manufacture of claim 10, wherein the preferred mobile network access technology is the legacy network access technology when the determined intended one mobile network band lacks sufficient neighboring base stations operating on the determined intended one mobile network band to support intra-frequency OTDOA over LTE.

12. The article of manufacture of claim 11, wherein the preferred mobile network access technology is LTE when the determined intended one mobile network band has sufficient neighboring base stations operating on the determined intended one mobile network band to support intra-frequency OTDOA over LTE.

13. The article of manufacture of claim 11, wherein:
the article of manufacture determines the number of current neighboring base stations operating on the determined intended one mobile network band reachable by the article of manufacture; and
when the determined number of currently reachable neighboring base stations meets or exceeds a threshold sufficient to support intra-frequency OTDOA over LTE, the preferred mobile network access technology is LTE.

14. The article of manufacture of claim 9, wherein:
the preferred mobile network access technology includes one of long term evolution (LTE) or a legacy network access technology;
the article of manufacture comprises logic in the non-transitory computer readable medium to support inter-frequency observed time difference of arrival (OTDOA) over LTE as one of the plurality of protocols for communication with the network to determine device position; and
the preferred mobile network access technology is LTE.

15. A method, comprising:
detecting, by a mobile device, each initiation of an E911 outbound call, wherein:
each E911 outbound call requires a position determination of the mobile device to be performed; and
the mobile device conducts each E911 outbound call over only one of Long Term Evolution (LTE) or a legacy network access technology;
identifying, by the mobile device, whether the mobile device supports inter-frequency observed time difference of arrival (OTDOA) over LTE;
establishing, by the mobile device, an E911 outbound call, over an available one of LTE or the legacy network access technology, upon identifying that the mobile device does support inter-frequency OTDOA over LTE;
upon identifying that the mobile device does not support inter-frequency OTDOA over LTE, determining, by the mobile device, whether the mobile device intends to establish an outbound call via LTE;
upon identifying that the mobile device does not support inter-frequency OTDOA and determining that the mobile device intends to establish an outbound call over LTE via a mobile network band with sufficient neighboring base stations operating on the mobile network band to support intra-frequency OTDOA over LTE, establishing, by the mobile device, the emergency E911 outbound call over LTE; and
upon identifying the mobile device does not support inter-frequency OTDOA and determining that the mobile device intends to establish an outbound call over LTE via the mobile network band which lacks the sufficient neighboring base stations operating on the mobile network band to support intra-frequency OTDOA over LTE, establishing, by the mobile device, the emergency E911 outbound call over the legacy network access technology.

16. The method of claim 15, wherein establishing the emergency E911 outbound call over the available one of LTE or the legacy network access technology upon identifying that the mobile device supports inter-frequency OTDOA over LTE includes:

receiving signals from a plurality of base stations, the plurality of base stations transmitting the signals in two or more frequency bands; and determining a geographic location of the mobile device based on the received signals.

17. The method of claim 16, wherein the plurality of signals include beacon signals.

18. The method of claim 15, wherein the legacy network includes a code division multiple access (CDMA) network.

19. The method of claim 15, further comprising:

determining whether the mobile device can determine a geographic location associated with the mobile device using a global positioning system (GPS) technology; and establishing the emergency E911 outbound call over the available one of LTE or the legacy network access technology when the mobile device can determine the associated geographic location using the GPS technology.

20. The method of claim 15, further comprising:

determining whether a quantity of the neighboring base stations operating on the mobile network band can be determined; and when the quantity of the neighboring base stations operating on the mobile network band cannot be determined, establishing the emergency E911 outbound call over the legacy network access technology.

* * * * *